United States Patent
Kadioglu et al.

(10) Patent No.: US 9,588,819 B2
(45) Date of Patent: Mar. 7, 2017

(54) SYSTEM AND METHOD OF ASSIGNING REQUESTS TO RESOURCES USING CONSTRAINT PROGRAMMING

(71) Applicant: Oracle International Corporation, Redwood Shores, CA (US)

(72) Inventors: Serdar Kadioglu, Somerville, MA (US); Michael Colena, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/808,231

(22) Filed: Jul. 24, 2015

(65) Prior Publication Data

US 2016/0306671 A1 Oct. 20, 2016

Related U.S. Application Data

(60) Provisional application No. 62/148,520, filed on Apr. 16, 2015.

(51) Int. Cl.
*G06F 9/46* (2006.01)
*G06F 9/50* (2006.01)
*G06F 17/30* (2006.01)

(52) U.S. Cl.
CPC ...... *G06F 9/5038* (2013.01); *G06F 17/30604* (2013.01)

(58) Field of Classification Search
CPC ........................................................ G06F 9/52
USPC ........................................................ 718/104
See application file for complete search history.

(56) References Cited

U.S. PATENT DOCUMENTS

| | | |
|---|---|---|
| 7,313,532 B2 | 12/2007 | Mariamova et al. |
| 7,478,419 B2 | 1/2009 | Anderson et al. |
| 8,065,255 B2 | 11/2011 | Colena et al. |
| 8,126,834 B2 | 2/2012 | Chen et al. |
| 8,165,980 B2 | 4/2012 | Chen et al. |
| 8,165,981 B2 | 4/2012 | Colena et al. |
| 8,301,582 B2 | 10/2012 | Huberman et al. |
| 8,447,716 B2 | 5/2013 | Bagley et al. |
| 8,504,501 B2 | 8/2013 | Colena et al. |
| 8,645,302 B2 | 2/2014 | Chen et al. |
| 8,751,425 B2 | 6/2014 | Bagley et al. |
| 2014/0089480 A1 | 3/2014 | Zhu |

(Continued)

OTHER PUBLICATIONS

Asaf et al., "Applying Constraint Programming to Identification and Assignment of Service Professionals", Springer-Verlag Berlin Heidelberg, 2010, pp. 24-37.

(Continued)

*Primary Examiner* — Andy Ho
(74) *Attorney, Agent, or Firm* — Precision IP

(57) ABSTRACT

A data model for application to a constraint programming solver is generated. The data model includes a set of data model elements. A particular data model element corresponds to a particular request. The particular data model element also corresponds to one or more resources that may be assigned to the request. The data model also includes a set of constraints. One or more sort/search algorithms may be applied with the data model to the constraint programming solver. The sort/search algorithms may direct the constraint programming solver to output certain preferred assignments of resources to requests.

20 Claims, 10 Drawing Sheets

(56) References Cited

U.S. PATENT DOCUMENTS

2015/0348065 A1* 12/2015 Doganata .......... G06Q 30/0202
                                                                                 705/7.31
2016/0086081 A1    3/2016 Lee et al.

OTHER PUBLICATIONS

Frisch et al., "The Rules of Constraint Modelling", Artificial Intelligence Group, Dept. of Computer Science, Univ. of York, UK, 2005, 8 pages.

IBM, "WebSpaere eXtreme Scale Overview", Available at : <http://www-01.ibm.com/support/knowledgecenter/SSTVLU_7.1.1/com.ibm.websphere.extremescale.doc/cxsoverview.html>, Retrieved on Aug. 27, 2015, 3 pages.

Kuhn, H. W., "The Hungarian Method for the Assignment Problem", Mar. 1955, pp. 83-97.

Milano et al., "Constraint Programming", Intelligenza Artificiale, vol. 3, No. 1-2, pp. 28-34, 2006.

Naveh et al., "Workforce Optimization: Identification and Assignment of Professional Workers Using Constraint Programming", Ibm J. Res. & Dev., vol. 51, No. 3/4, May / Jul. 2007, pp. 263-279.

Richter et al., "Optimatch: Applying Constraint Programming to Workforce Management of Highly Skilled Employees", Int. J. Services Operations and Informatics, vol. 3, N. 3/4, 2008, pp. 258-270.

Slaney, John, "Constraint Modelling: A Challenge for First Order Automated Reasoning", NICTA and the Australian National University, Jul. 2009, pp. 11-21.

Smith, Barbara M., "A Tutorial on Constraint Programming", School of Computer Studies Research Report Series, Apr. 1995, pp. 1-21.

Smith, Barbara M., "Modelling for Constraint Programming", Cork Constraint Computation Centre, University College Cork, Ireland, Sep. 2005, 18 pages.

* cited by examiner

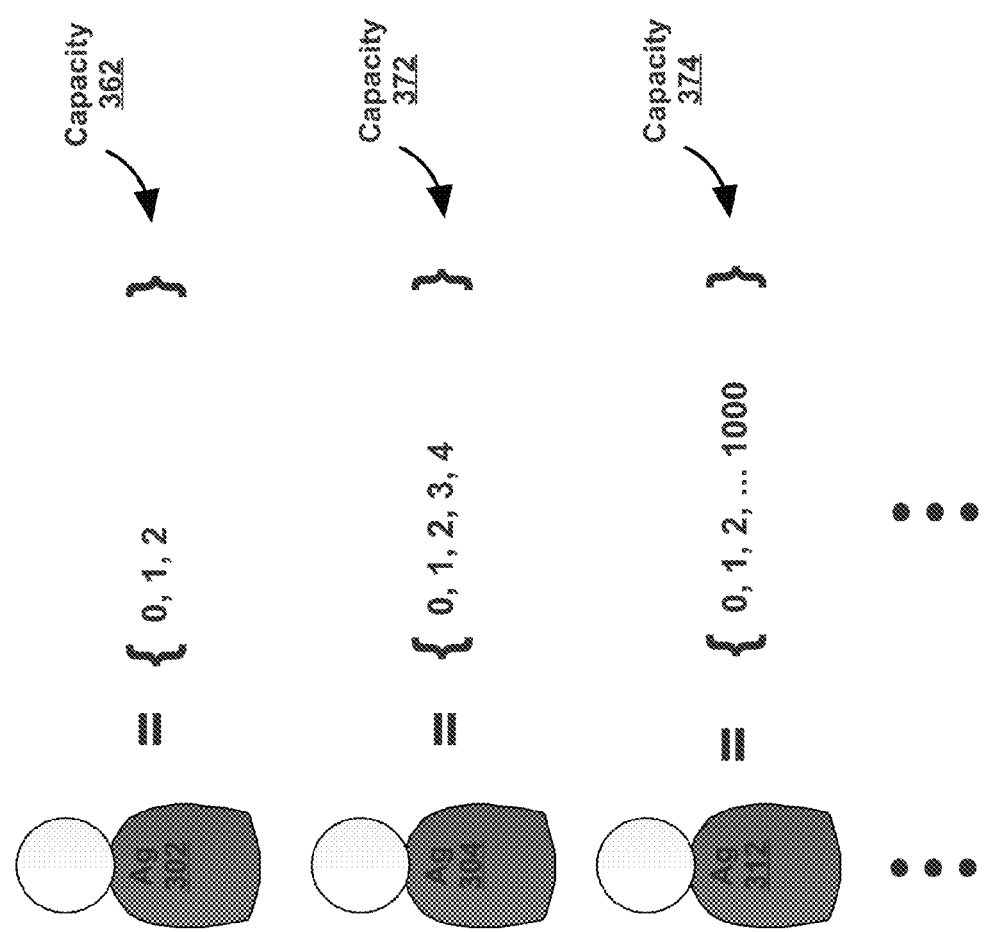

SYSTEM AND METHOD OF ASSIGNING REQUESTS TO RESOURCES USING CONSTRAINT PROGRAMMING

BENEFIT CLAIM; INCORPORATION BY REFERENCE

This application claims the benefit of U.S. Provisional Patent Application No. 62/148,520, filed Apr. 16, 2015, which is hereby incorporated by reference.

The present disclosure further incorporates by reference each of the following patent applications:

U.S. patent application Ser. No. 12/187,837, filed Aug. 7, 2008;
U.S. patent application Ser. No. 12/188,525, filed Aug. 8, 2008;
U.S. patent application Ser. No. 12/258,593, filed Oct. 27, 2008;
U.S. patent application Ser. No. 12/258,862, filed Oct. 27, 2008;
U.S. patent application Ser. No. 12/270,350, filed Nov. 13, 2008;
U.S. patent application Ser. No. 12/270,366, filed Nov. 13, 2008;
U.S. patent application Ser. No. 12/270,414, filed Nov. 13, 2008;
U.S. patent application Ser. No. 12/276,644, filed Nov. 24, 2008;
U.S. patent application Ser. No. 12/358,687, filed Jan. 23, 2009;
U.S. patent application Ser. No. 12/362,209, filed Jan. 29, 2009;
U.S. patent application Ser. No. 12/366,033, filed Feb. 5, 2009;
U.S. patent application Ser. No. 12/427,037, filed Apr. 21, 2009;
U.S. patent application Ser. No. 12/427,914, filed Apr. 22, 2009;
U.S. patent application Ser. No. 12/430,600, filed Apr. 27, 2009;
U.S. patent application Ser. No. 12/431,086, filed Apr. 28, 2009;
U.S. patent application Ser. No. 12/431,096, filed Apr. 28, 2009;
U.S. patent application Ser. No. 12/483,647, filed Jun. 12, 2009;
U.S. patent application Ser. No. 12/490,725, filed Jun. 24, 2009;
U.S. patent application Ser. No. 12/509,546, filed Jul. 27, 2009;
U.S. patent application Ser. No. 12/579,850, filed Oct. 15, 2009;
U.S. patent application Ser. No. 13/342,725, filed Jan. 3, 2012; and
U.S. patent application Ser. No. 13/972,490, filed Aug. 21, 2013.

TECHNICAL FIELD

The present disclosure relates to the use of constraint programming. In particular, the present disclosure relates to assigning requests to resources using constraint programming.

BACKGROUND

Many enterprises handle a heavy workload on a daily basis. The heavy workload includes many requests for different types of work to be performed. An example request is a customer service request, in which a customer may ask for help with using goods or services that a company has provided to the customer. Another example request is a work order that specifies a product, or components thereof, to be manufactured. Another example request is an order that utilizes certain medical machinery to perform tests or examinations.

Many enterprises have multiple resources for handling the workload. Examples of resources include people (human resources), machines, and software applications. Each resource has different capabilities. In an example, customer service agents, who respond to customer service requests, have different capabilities. One agent may be skilled in Google® Android® operating systems, while another agent may be skilled in Apple® iOS® operating systems (Google® and Android® are registered trademarks of Google, Inc.; Apple® is a registered trademark of Apple, Inc.; iOS® is a registered trademark of Cisco Systems, Inc., and is used under license by Apple, Inc.). In another example, different machines have different features, which are capable of producing different products or components.

In order for the requests to be completed, requests need to be assigned to resources. However, inefficient assignments may lead to unsatisfactory completion of requests. For example, requests may not be completed in a timely manner, requests may not be completed by a well-suited resource, and/or requests may not be completed in accordance with customer requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3D illustrate an example data model for application to a constraint programming solver for assigning requests to resources, in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GENERATING A DATA MODEL FOR APPLICATION TO A CONSTRAINT PROGRAMMING SOLVER
4. EXAMPLE EMBODIMENT
5. MISCELLANEOUS; EXTENSIONS
6. HARDWARE OVERVIEW

1. General Overview

One or more embodiments include creating a data model that may be input to a constraint programming solver. The data model includes (a) a set of constraints that limit assignments of requests to a resource based on a number and/or type of request(s) already assigned to the resource. The data model further includes (b) a set of data model elements corresponding to a respective plurality of requests. Determining a data model element for a request includes (a) identifying a candidate set of resources with resource capabilities that include a set of resource capabilities required for completion of the request and (b) including the identifiers of the candidate set of resources in the data model element.

In an embodiment, creating the data model includes creating a software data object including a set of data structure elements. The set of data structure elements correspond respectively to the plurality of requests. Each data structure element includes a set of identifiers corresponding to the candidate set of resources for completing the respective request. In an embodiment, the data model includes a number and/or a type of requests that may be concurrently assigned to each resource in the candidate set of resources.

One or more embodiments include applying or causing application of a constraint programming solver to the data model. The constraint programming solver evaluates the data model. The constraint programming solver then assigns, to each particular request in a set of requests, a particular resource from the candidate set of resources selected for the particular request. One or more embodiments include, prior to causing application of a constraint programming solver to the data model, sorting and/or filtering the identifiers corresponding to the candidate set of resources based on the attributes of the candidate set of resources. One or more embodiments include selecting a search algorithm, based on a specified goal, to be applied with the data model to a constraint programming solver.

In an embodiment, the candidate set of resources, selected for a request, includes identifiers for fictional resources that (a) serve as placeholders and (b) can be temporarily assigned to a request.

2. Architectural Overview

Figure 1A:
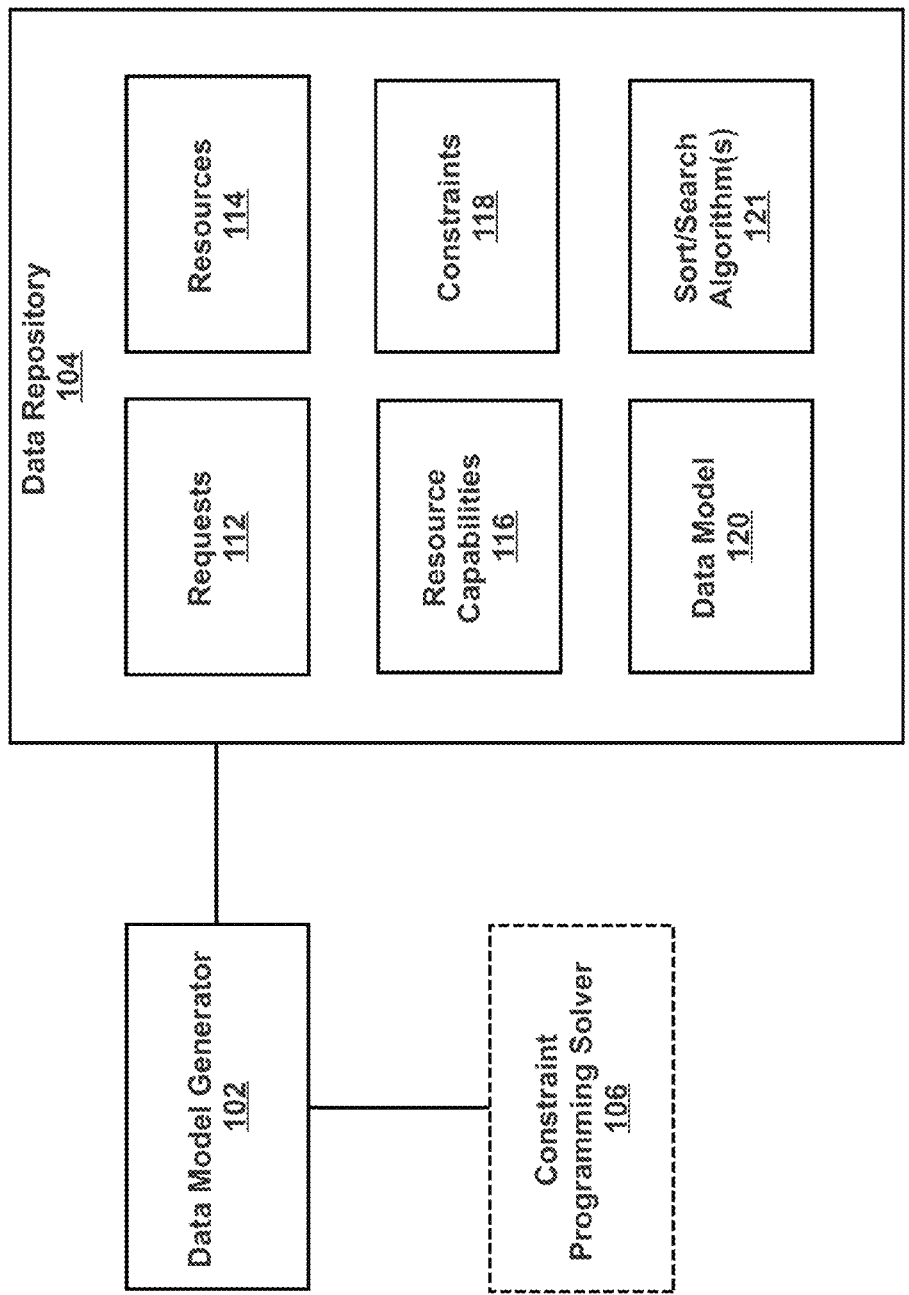
FIGS. 1A-1B illustrate a system in accordance with one or more embodiments.

FIG. 1A illustrates a system 100 in accordance with one or more embodiments. As illustrated in FIG. 1A, system 100 includes a data model generator 102 and a data repository 104. System 100 optionally includes a constraint programming solver 106. In one or more embodiments, system 100 may include more or less components, than the components illustrated in FIG. 1A. The components illustrated in FIG. 1A may be local to or remote from each other. The components illustrated in FIG. 1A may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as one or more components within system 100 (for example, data model generator 102). Alternatively or additionally, data repository 104 may be on a separate computing system than other components within system 100. Data repository 104 may be connected to data model generator 102 via a direct connection or via a network.

Requests 112, resources 114, resource capabilities 116, constraints 118, data model 120, and sort/search algorithm(s) 121 may be implemented across any of components within system 100. However, these components are illustrated within data repository 104 for purposes of clarity and explanation.

In one or more embodiments, requests 112 correspond to requests for performance of one or more tasks by one or more resources 114. Examples of requests 112 include requests for the delivery of services, production of products, execution of operations, and/or performance of other tasks. In an example, a request may be a customer service request that seeks assistance with goods and services offered by a company. In another example, a request may be a work order for certain machinery to manufacture a product or a component thereof. In an example, one customer service request may require assistance with a cellular phone executing a Google Android operating system. Another customer service request may require assistance with a cellular phone executing an Apple iOS operating system. In another example, one work order may request the manufacturing of a smartphone case. Another work order may request the manufacturing of a laptop case.

In an embodiment, a request 112 may originate from sources internal or external to an enterprise that is to perform the request 112. External sources may include customers or vendors of an enterprise. Internal sources may include employees or applications managed by an enterprise. Enterprise as used herein may refer to any organization of persons, such as a business, university, government, military, nonprofit organization, or social club.

In an embodiment, each of requests 112 is associated with a unique identifier. A request is referenced by components within system 100 by its unique identifier. Each of requests 112 is further be associated with one or more attributes. An example attribute is a priority level, such as high priority or low priority. As another example, an attribute is a way in which a request is performed, such as via telephone, Internet chat, or email. As another example, an attribute is a wait time, which is a period of time in which a particular request has been pending, or awaiting assignment to a resource.

In one or more embodiments, resources 114 include people, machines, software applications, assets, and/or other objects that may be utilized to complete one or more units of work, such as requests 112. A resource may be, for example, an agent who responds to customer service requests. As another example, a resource may be manufacturing machinery. As another example, a resource may be a software application. Each of resources 114 may be associated with a unique identifier.

In an embodiment, resources 114 include fictional resources. A fictional resource includes an identifier that may be assigned to a particular request. However, the fictional resource does not correspond to any actual resource that can perform the task. The fictional resource is assigned as a placeholder to the request. A fictional resource may be temporarily assigned to a request until an actual resource that can perform the request is available. The assignment of a fictional resource to a particular request indicates that no actual resource is currently available to complete the particular request.

In one or more embodiments, resource capabilities 116 are associated with resources 114. Resource capabilities 116 may correspond to skills of a person, capabilities of a machine (e.g., processing or storage capabilities), and/or features of a software application, among potentially other capabilities. A set of resource capabilities 116 that are possessed by a particular resource may be referred to herein as a "possessed set of resource capabilities" for the particular resource. Resource capabilities 116 may be grouped into different types of capabilities.

In an example, for a resource that is a person, a first resource capability may include expertise in the Android operating system, and a second resource capability may include expertise in the iOS operating system. A person may have expertise in the Android operating system, the iOS operating system, or both. The first resource capability and the second resource capability may be referred to as technical capabilities.

As another example, resource capabilities may include the ability to speak English, the ability to speak Chinese, and the ability to speak French. These resource capabilities may be referred to as language capabilities.

As another example, resource capabilities of a manufacturing machine may include the ability to produce plastic goods, and the ability to produce metal goods. These resource capabilities may be referred to as capabilities in producing goods in particular materials.

In an embodiment, each resource capability associated with a particular resource is further associated with a level. A level may be a number, scalar value, or other designation, representing a level of expertise corresponding to a resource capability possessed by the particular resource. The level may be used to sort resources by how skilled the resources are in one or more resource capabilities.

In an example, levels of resource capabilities may range from one to five, indicating least skilled to most skilled. A customer service agent may have a high level of expertise with the Android operating system and an intermediate level of expertise with the iOS operating system. Under these circumstances, the customer service agent's expertise with the Android operating system may be associated with level five, and the customer service agent's expertise with the iOS operating system may be associated with level three.

In an embodiment, resource capabilities 116 are determined to be associated with fictional resources. While a fictional resource does not actually possess any resource capabilities, a fictional resource may be determined to have one or more resource capabilities, for purposes of using the fictional resource as a placeholder. Further, levels of skill associated with each resource capability of the fictional resource may be determined to be the lowest level of skill.

In an embodiment, particular resource capabilities 116 of a resource 114 are either preferred or required for the resource 114 to perform a request 112. One or more sets of resource capabilities 116 may be associated with a single request. A first set of one or more resource capabilities 116 may be required for completion of a particular request. This set of resource capabilities 116 may be referred to herein as a "required set of resource capabilities" for the particular request. A second set of one or more resource capabilities 116 may be preferred for completion of the particular request. This set of resource capabilities 116 may be referred to herein as a "preferred set of resource capabilities" for the particular request. In an example, a required set of resource capabilities 116 may correspond to a first type of resource capabilities (such as language capabilities), while a preferred set of resource capabilities 116 may correspond to a second type of resource capabilities (such as technical capabilities).

In an example, a customer service request may correspond to assistance needed with a cell phone executing an Android operating system. The customer service request may be made by a customer that speaks Chinese but does not speak English. In this example, Chinese language skills is a required resource capability. A customer service agent that does not speak Chinese will not be able to assist the customer. Expertise with the Android operating system is a preferred resource capability, but not a required resource capability. The customer service agent may have background technical skills that would still likely help with responding to questions asked by the customer. Thus, technical capabilities associated with a request may be preferred but not required in this particular example.

In another example, a customer service request may correspond to assistance needed with spreadsheet formulas. In this example, expertise with spreadsheets may be a required technical capability of a customer service agent to complete the customer service request.

In one or more embodiments, constraints 118 include restrictions on how requests 112 may be assigned to resources 114. In an example, a constraint limits an assignment of a resource for completion of a particular request based on an assignment of the resource to one or more other requests. A single constraint or multiple constraints 118 may correspond to a particular resource. Different constraints 118 may correspond to different resources 114.

In an embodiment, a constraint defines a maximum capacity of a resource. In one example, a constraint corresponds to a counting constraint. The counting constraint defines a maximum number of requests that may be concurrently assigned to a resource. A request may be assigned to a particular resource depending on how many requests are currently assigned to the particular resource. In an example, a first customer service agent may be able to concurrently handle a maximum of three customer service requests. Furthermore, a second customer service agent may be able to concurrently handle a maximum of two customer service requests.

In an embodiment, a constraint for a resource defines a combination of different types of requests. The combination indicates a maximum number of each type of request that may be concurrently assigned to a resource. In an example, one type of request may be requests that are made via telephone, and another type of request may be requests made via Internet chat. A customer service agent may be able to concurrently handle a maximum of one telephone request and two chat requests.

In an embodiment, a constraint is a maximum frequency with which a new request may be assigned to a resource. In an example, a customer service agent may be able to complete one customer service request in an average of five minutes. This may allow a new customer service request to be assigned to the customer service agent every five minutes. A constraint for this customer service agent may allow assignment of a new request when the last request assigned to the customer service agent was more than five minutes ago.

In one or more embodiments, data model 120 refers to a particular organization, structure, or representation of information. Data model 120 may be a format in which real-world information is communicated within an information system. In an example, data model 120 may be generated by data model generator 102 based on requests 112, resources 114, resource capabilities 116, and/or constraints 118. Data model 120 may then be input to constraint programming solver 106 for assigning resources 114 to requests 112. Example operations for generating data model 120 and inputting data model 120 to constraint programming solver 106 are described below with reference to FIG. 2A.

Figure 1B:
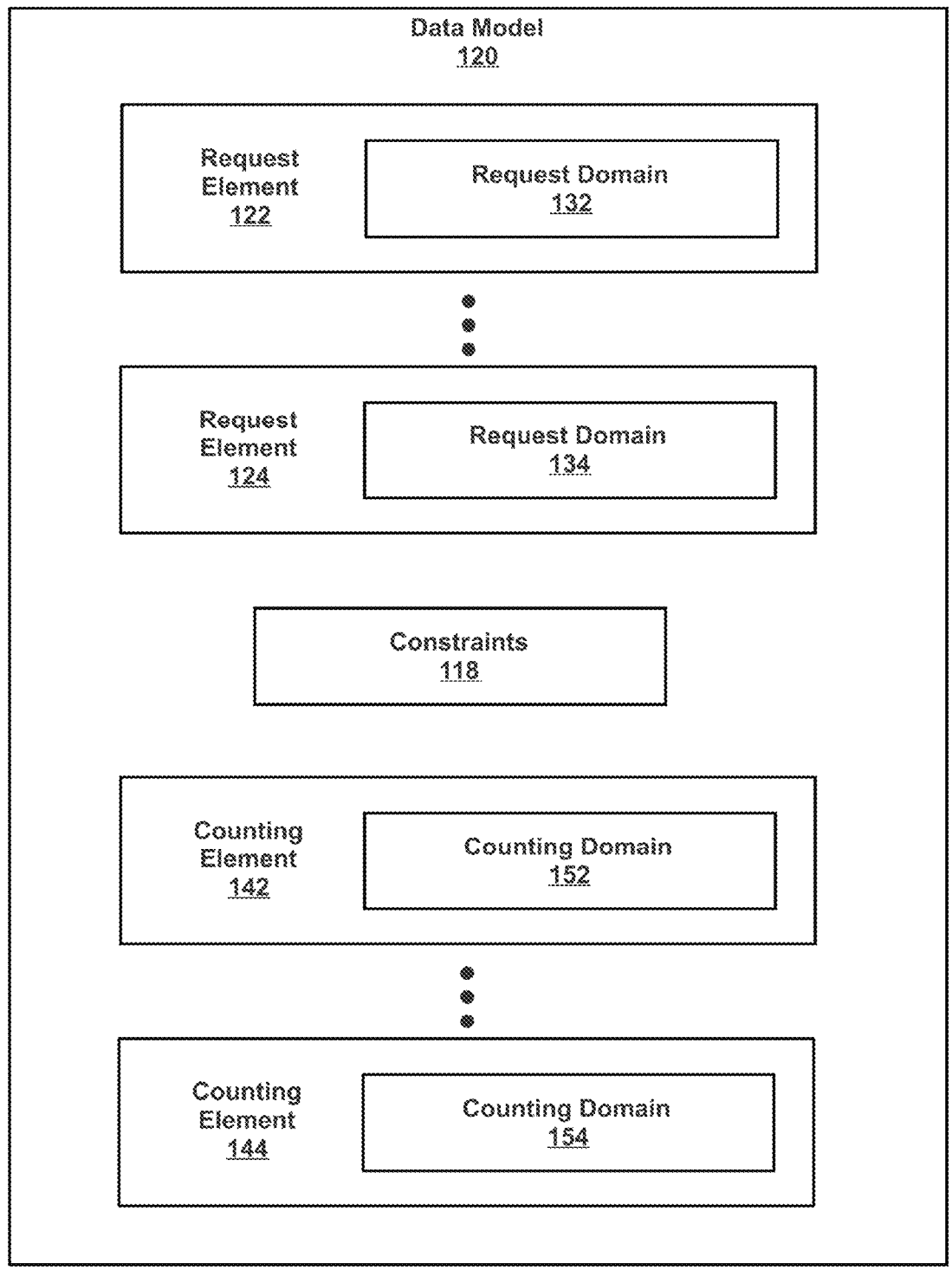

Examples of attributes of a data model 120 are illustrated in FIG. 1B. In one or more embodiments, data model 120 includes one or more data model elements such as request elements 122-124 and counting elements 142-144. Request elements 122-124 represent requests 112. Each request element (such as request element 122 or request element 124) is associated with a request domain (such as request domain 132 or request domain 134). A request domain, corresponding to a particular request, includes a set of possible resources 114 that may be assigned to the particular request. A request domain may include all or a subset of resources 114.

In an example, each request domain includes a candidate set of resources, filtered from resources 114, that may be assigned to a particular request based on resource capabilities 116 required and/or preferred for completion of the particular request. A candidate set of resources 114 may include each resource that possesses the resource capabilities 116 required for completion of the particular request. Alternatively, a candidate set of resources 114 may include each resource that that possesses both the resource capabilities 116 required for completion of the particular request and the resource capabilities 116 preferred for completion of the particular request. One of resources 114 may appear in none, one, or more of request domains 132-134.

In an example, a request domain includes a candidate set of resources that possess the resource capabilities required for completion of the request. A first resource R1 is a person that is able to speak English, a second resource R2 is a person that is able to speak Chinese, and a third resource R3 is able to speak English and Chinese. English is required for completion of a first request Q1. Chinese is required for completion of a second request Q2. Under these circumstances, a request domain of Q1 may include the resources who are able to speak English, that is, {R1, R3}. A request domain of Q2 may include the resources who are able to speak Chinese, that is, {R2, R3}.

In an embodiment, resource elements (not shown) may be included in data model 120. Resource elements may represent resources 114. Each resource element may be associated with a resource domain. A resource domain, corresponding to a particular resource, may include a set of possible requests 112 that may be assigned to the particular resource. A resource domain may include all or a subset of requests 112.

In an embodiment, counting elements 142-144 represent the current number of requests assigned to a resource. Each counting element (such as, counting element 142 or counting element 144) is associated with a counting domain (such as, counting domain 152 or counting domain 154). A set of possible values for a counting element is specified by the counting domain. In an example, a constraint identifies a maximum number of requests that may be concurrently assigned to a particular resource as five. Based on the constraint, a counting domain is determined. The counting domain for the particular resource is a set of sequential numbers running from zero to five, such as {0, 1, 2, 3, 4, 5}. Each time a request is assigned to the particular resource, the counting element is incremented by one, using the counting domain.

In an embodiment, data model 120 is a software data structure. The software data structure is readable by a machine. The software data structure is an input to hardware and/or software configured to assign resources to requests, such as constraint programming solver 106. Data model elements (such as request elements 122-124 and counting elements 142-144) are data structure elements within a software data structure. Request elements 122-124 are stored in one or more data structure elements. Counting elements 142-144 are stored in one or more data structure elements. Request elements 122-124 may be stored in a same or different data structure element that stores counting elements 142-144. In an example, a data structure element may be an array. An array corresponds to a data model element, and elements of the array correspond to the domain of the data model element. Other examples of data structure elements include vectors, linked lists, tables, and/or other software data objects.

In an embodiment, sort/search algorithm(s) 121 are applied with data model 120 to constraint programming solver 106. Sort/search algorithm(s) 121 may include sort algorithms, search algorithms, or both. Sort/search algorithm(s) 121 direct constraint programming solver 106 to arrive at a preferred solution or to achieve a specified goal. A preferred solution or specified goal is context specific. A goal may be, for example, to assign high priority requests before low priority requests. Another goal may be, for example, to assign resources with high levels of expertise before resources with low levels of expertise. Another goal may be, for example, to achieve load balancing across resources 114, that is, to distribute requests 112 to resources 114 in a balanced manner. In an example, sort/search algorithm(s) 121 may be configured to process a particular request, before other requests, based on an attribute of the particular request. In another example, sort/search algorithm(s) 121 may be configured to assign a particular resource to a particular request, rather than another resource, based on an attribute of the particular resource. Example operations performed by sort/search algorithm(s) 121 are described below with respect to FIGS. 2B and 2C.

In an embodiment, each sort/search algorithm is associated with a unique identifier. The identifier may be used to specify a particular sort/search algorithm as an input parameter to constraint programming solver 106.

In one or more embodiments, data model generator 102 refers to hardware and/or software configured to perform operations described herein for generating data model 120. Example operations for generating data model 120 are described below with reference to FIG. 2A.

In an embodiment, data model generator 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a mainframe, a television, a content receiver, a set-top box, a printer, a mobile handset, a smartphone, and a personal digital assistant ("PDA").

In one or more embodiments, constraint programming solver 106 refers to hardware and/or software configured to perform operations described herein for assigning resources 114 to requests 112 based on data model 120. Constraint programming solver may be configured to apply constraint programming algorithms well-known in the art, such as backtracking and forward checking Constraint programming solver may be configured to assign each request to a resource.

3. Generating a Data Model for Application to a Constraint Programming Solver

Figure 2A:
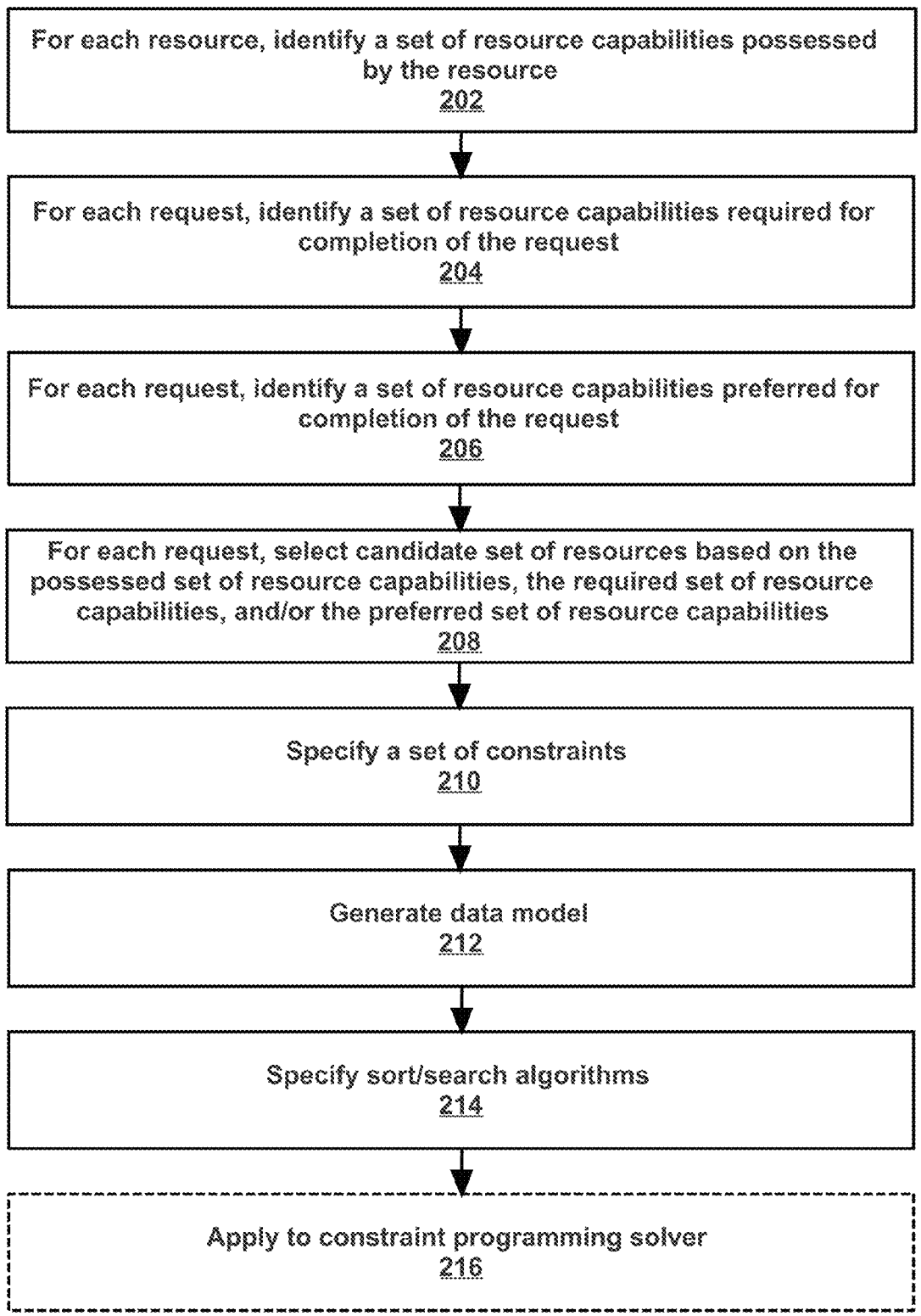
FIG. 2A illustrates an example set of operations for generating a data model for application to a constraint programming solver for assigning requests to resources, in accordance with one or more embodiments.

FIG. 2A illustrates an example set of operations for generating a data model for application to a constraint programming solver for assigning requests to resources, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, a set of resource capabilities possessed by each resource in a set of available resources is identified (Operation 202), in accordance with one or more embodiments. The set of available resources is retrieved from a database. In an example, when a customer service agent arrives at work, the customer service agent may check-in at a timecard system, indicating the customer service agent's availability to take a request. The check-in may be updated in a database. In another example, when a customer service agent hangs up from a telephone call serving a customer service request, a system may detect that the telephone call has terminated, indicating the customer service agent's availability to take another customer service request. The termination of the telephone call may be updated in a database.

In an embodiment, a set of resource capabilities possessed by a particular resource is retrieved from a database. In an example, an employee of an enterprise may enter the employee's resource capabilities into the database. The resource capabilities entered by the employee may be updated in a database. In another example, a system may scrape an employee's resume to identify the employee's resource capabilities. The resource capabilities identified by the system may be updated in a database.

In an embodiment, various levels of skill associated with a set of resource capabilities of a resource are identified. The level of skill for a resource capability of a resource is retrieved from a database. In an example, an employee may enter the level of skill that the employee has in a particular resource capability. The level of skill entered by the employee may be updated in a database.

In another example, a system may track customer satisfaction for requests requiring different resource capabilities. A system may determine a first average customer satisfaction level delivered by a particular employee when handling customer service requests corresponding to questions about motorcycles. The system may determine a second customer satisfaction level delivered by the particular employee when handling customer service requests corresponding to questions about sedans. The system may map the first average customer satisfaction level to a first level of skill, associated with the particular employee's expertise in motorcycles. The system may map the second average customer satisfaction level to a second level of skill, associated with the particular employee's expertise in sedans. The system may assign a level of five for the highest level of customer satisfaction and a level of one for the lowest level of customer satisfaction.

In another example, a system may track error rates of a manufacturing machine in producing different types of goods. The system may determine that a first error rate in producing plastic goods is 90%, while a second error rate in producing metal goods is 85%. The system may map the first error rate of 90% to a first level of skill, associated with the manufacturing machine's ability to produce plastic goods. The system may map the second error rate of 85% to a second level of skill, associated with the manufacturing machine's ability to produce metal goods.

In an example, a fictional resource may be included in the set of available resources. Resource capabilities of the fictional resource may be identified. A fictional resource may be determined to have each resource capability that is required for completion of any of the available requests, and each resource capability that is preferred for completion of any of the available requests. Alternatively a fictional resource may be determined to have each resource capability that is required for completion of any of the available requests, but not any resource capability that is preferred for completion of any of the available requests. Further, levels of skill associated with each resource capability of the fictional resource may be identified. A lowest level of skill may be identified for each resource capability.

In one or more embodiments, a set of resource capabilities required for completion of each of a set of received requests is identified (Operation 204). The set of available requests is retrieved from a database. In an example, an employee may enter work orders for components of products to be manufactured by various machines into a database. The work orders may be updated in a database. In another example, a system may receive telephone calls corresponding to customer service requests. The system also tracks telephone calls that are already assigned to resources. Newly received telephone calls are logged and stored in a database as available requests. Telephone calls that are assigned to resources are removed from the set of available requests.

In an embodiment, a set of resource capabilities required for completion of a particular request is retrieved from a database. The database stores various types of capabilities, such as language capabilities and technical capabilities, associated with a particular request. The database indicates that a first type of capability is required, while a second type of capability is not required.

In an example, a database may indicate that language capabilities associated with a request are required for completion of the request, while technical capabilities associated with a request are not required for completion of the request. This indicates that a customer service agent must speak the language that is associated with a customer service request to be assigned to the customer service agent. However, the customer service agent need not necessarily have the technical skill that is associated with the customer service request to be assigned to the customer service agent.

In another example, a database may indicate that expertise in certain areas of medical specialties (such as, rheumatology, dermatology, and obstetrics and gynecology) are required for completion of a request, while an ability to operate in a particular patient database is not required for completion of the request. This indicates that the doctor must have expertise in a medical specialty associated with a patient's request to seek medical assistance. However, the doctor need not necessarily be skilled in operating a particular patient database that is used to record the medical history of the patient.

In an embodiment, a database of resource capabilities, for each request, is maintained using various methods. In an example, a system may ask a customer what language is to be used for serving the customer's customer service request.

The customer may specify that English is to be used via a user interface, such as, by making a selection through a touchtone phone. The selected language may be updated in a database as a required resource capability for the request. In another example, a system may detect a language spoken by a customer. The detected language may be updated in a database as a required resource capability for the request.

In one or more embodiments, a set of resource capabilities preferred for completion of each of a set of received requests is identified (Operation 206). In an embodiment, a set of resource capabilities preferred for completion of a particular request is retrieved from a database. The database stores various types of capabilities, such as language capabilities and technical capabilities, associated with a particular request. The database indicates that a first type of capability is preferred, while a second type of capability is not preferred.

In an example, the database may indicate that technical capabilities associated with a request are preferred for completion of the request, while language capabilities associated with a request are not preferred for completion of the request. This indicates that a customer service agent who has expertise in a particular technical area associated with a request is preferred, but not required, for completion of the request.

In an embodiment, a database of resource capabilities is maintained using various methods. In an example, a system may ask a customer what technical area is involved in a customer service request. The customer may specify that Android is the subject of the customer service request via a user interface, such as, by making a selection through a touchtone phone. The selected technical area may be updated in a database as a preferred resource capability for the request. In another example, a system may detect a technical area of a customer service request using speech recognition. The system may detect that the word "Android" is spoken by the customer over the telephone. The detected technical area may be updated in a database as a preferred resource capability for the request.

In one or more embodiments, a candidate set of resources are selected, for each of a set of received requests, based on the possessed set of resource capabilities for a resource, the required set of resource capabilities for the request, and/or the preferred set of resource capabilities for the request (Operation 208). A candidate set of resources, for a particular request, is selected based on different criteria. In an embodiment, each of a candidate set of resources, for a particular request, possesses the resource capabilities that are required for completion of the particular request. For each available request and each available resource, the required set of resource capabilities is compared against the possessed set of resource capabilities. A resource is selected for a request if the possessed set of resource capabilities for the resource include the required set of resource capabilities for the request.

In an example, a first resource R1 may be a person who speaks English, French, and Russian. A second resource R2 may be a person who speaks English. A third resource R3 may be a person who speaks French. A particular request Q1 may be made in English. The sets of resource capabilities associated with each resource and request is summarized in Table 1 below:

TABLE 1

| Resource/Request | Associated Resource Capabilities |
| --- | --- |
| R1 | English, French, Russian |
| R2 | English |
| R3 | French |
| Q1 | English |

As can be seen from Table 1, the possessed set of resource capabilities for R1 includes the required set of resource capabilities for Q1. The possessed set of resource capabilities for R2 includes the required set of resource capabilities for Q1. The possessed set of resource capabilities for R3 does not include the required set of resource capabilities for Q1. Thus, R1 and R2 may be selected as being in the candidate set of resources for Q1, but not R3.

In an embodiment, each of a candidate set of resources, for a request, possesses the resource capabilities that are required for completion of the request and the resource capabilities that are preferred for completion of the request. For each request and each resource, the required set of resource capabilities is compared against the possessed set of resource capabilities, and the preferred set of resource capabilities is also compared against the possessed set of resource capabilities. A resource is selected for a request if the possessed set of resource capabilities for the resource includes both the required set of resource capabilities and the preferred set of resource capabilities for the request.

In an example, a first resource R1 may be a person who speaks English, French, and Russian, and is skilled in Android. A second resource R2 may be a person who speaks English, and is skilled in iOS. A third resource R3 may be a person who speaks French, and is skilled in Android and iOS. A particular request Q1 may be made in English and may relate to questions about Android. The sets of resource capabilities associated with each resource and request is summarized in Table 2 below:

TABLE 2

| Resource/Request | Associated Resource Capabilities |
| --- | --- |
| R1 | English, French, Russian, Android |
| R2 | English, iOS |
| R3 | French, Android, iOS |
| Q1 | English, Android |

As can be seen in Table 2, the possessed set of resource capabilities for R1 includes the required set and preferred set of resource capabilities for Q1. The possessed set of resource capabilities for R2 does not include the required set and preferred set of resource capabilities for Q1. The possessed set of resource capabilities for R3 does not include the required set and preferred set of resource capabilities for Q1. Thus, R1 may be selected as being in the candidate set of resources for Q1, but not R2 and R3.

In an embodiment, criteria for determining a candidate set of resources for a request depends on one or more attributes of the request. In an example, one criterion applies if a priority attribute of a request is above a threshold value. A different criterion applies if a priority attribute of a request is equal to or below the threshold value. The threshold value may be a priority level of two. A first request may be associated with a priority level of one. A candidate set of resources for the first request may be resources that possess the resource capabilities required for completion of the first request. A second request may be associated with a priority level of three. A candidate set of resources for the second request may be resources that possess both the resource capabilities required for completion of the second request and the resource capabilities preferred for completion of the second request.

In an embodiment, a fictional resource is included in the candidate set of resources for all available requests. The fictional resource is determined to be associated with one or more resource capabilities. In an example, a set of resource capabilities that is considered to be possessed by a fictional resource F may include all resource capabilities required for completion of any request and/or all resource capabilities preferred for completion of any request. Thus, F may be selected as being in the candidate set of resources for every request.

In one or more embodiments, a set of constraints is specified (Operation 210). The set of constraints may be specified by generating the set of constraints or receiving the set of constraints. In an example, a constraint may be a maximum capacity of a resource that is generated based on historical information. Historical information may include the number of requests that a resource handled concurrently in the past, and the level of customer satisfaction delivered while handling that number of requests concurrently. If a particular customer service agent handled three customer service requests with a high level of customer satisfaction, but handled four customer service requests with a low level of customer satisfaction, then a maximum capacity of the particular customer service agent may be determined to be three.

In another example, a constraint may be received from a user interface or another system. An employee may enter, through a user interface, that the employee is able to handle a maximum of one customer service request made via telephone and two customer service requests made via Internet chat. This information may be received through the user interface as a constraint corresponding to the employee.

In an embodiment, a set of constraints to be included in a data model is selected from a set of available constraints. The selection is based on attributes of the set of available requests. In an example, a first constraint of a particular employee may be a maximum of one customer service request made via telephone and two customer service requests made via Internet chat. A second constraint of the particular employee may be a maximum of four customer service requests made via Internet chat, if no customer service requests via telephone are taken. The set of available requests may include customer service requests made via Internet chat, but no telephone calls. The first constraint of the particular employee is not relevant to the set of available requests. The second constraint of the particular employee is selected.

In an embodiment, one or more constraints are specified for a fictional resource. In an example, a maximum capacity of a fictional resource may be determined to be equal to the number of available requests. If there are nine available requests, then a constraint for the fictional resource is nine.

In one or more embodiments, a data model is generated (Operation 212). A data model includes request elements representing the set of available requests. Each request element is associated with a request domain. A request domain, corresponding to a particular request, includes identifiers of one or more resources that may be assigned to the particular request. In an embodiment, a request domain includes identifiers of a candidate set of resources that have resource capabilities required for completion of the request. In another embodiment, a request domain includes identifiers of a candidate set of resources that have both resource capabilities required for completion of the request and resource capabilities preferred for completion of the request.

In an embodiment, a request domain includes an identifier of a fictional resource. Since a fictional resource is associated with all resource capabilities that are required for completion of any request, the candidate set of resources for any request includes the fictional resource.

In an embodiment, a data model includes counting elements representing the numbers of requests currently assigned to the set of available resources. Each counting element is associated with a counting domain, which specifies a set of possible values for the counting element.

In an example, a maximum capacity of a resource R1 may be two requests. A set of available requests include Q1, Q2, and Q3. Possible values for a counting element of R1 that comply with this constraint include any arrangement that assigns two or less requests to R1. A counting domain for R1 may be represented as the number of requests assigned to R1, or {0, 1, 2}. Each time a request is assigned to R1, the counting element is incremented by one, using the counting domain. Alternatively, a counting domain for R1 may be represented by sets of requests that may be assigned to R1. One set of requests that may be assigned to R1 and comply with the constraint is assigning Q1 to R1. Another set of requests that may be assigned to R1 and comply with the constraint is assigning Q1 and Q2 to R1. The different sets of requests that may be assigned to R1 may be represented as {[none], Q1, Q2, Q3, Q1 and Q2, Q2 and Q3, Q1 and Q2}.

In an embodiment, a counting domain for a fictional resource F is represented by a sequential set of numbers running from zero to the total number of available requests. If a total number of available requests is five, then a counting domain for F may be {0, 1, 2, 3, 4, 5}.

In one or more embodiments, one or more sort/search algorithms are specified (Operation 214). A sort/search algorithm is specified based on one or more specified goals. To achieve these goals, sort/search algorithms may be configured to process a particular request, before other requests, based on an attribute of the particular request. Alternatively or additionally, sort/search algorithms may be configured to assign a particular resource to a particular request, rather than another resource, based on an attribute of the particular resource.

Figure 2B:
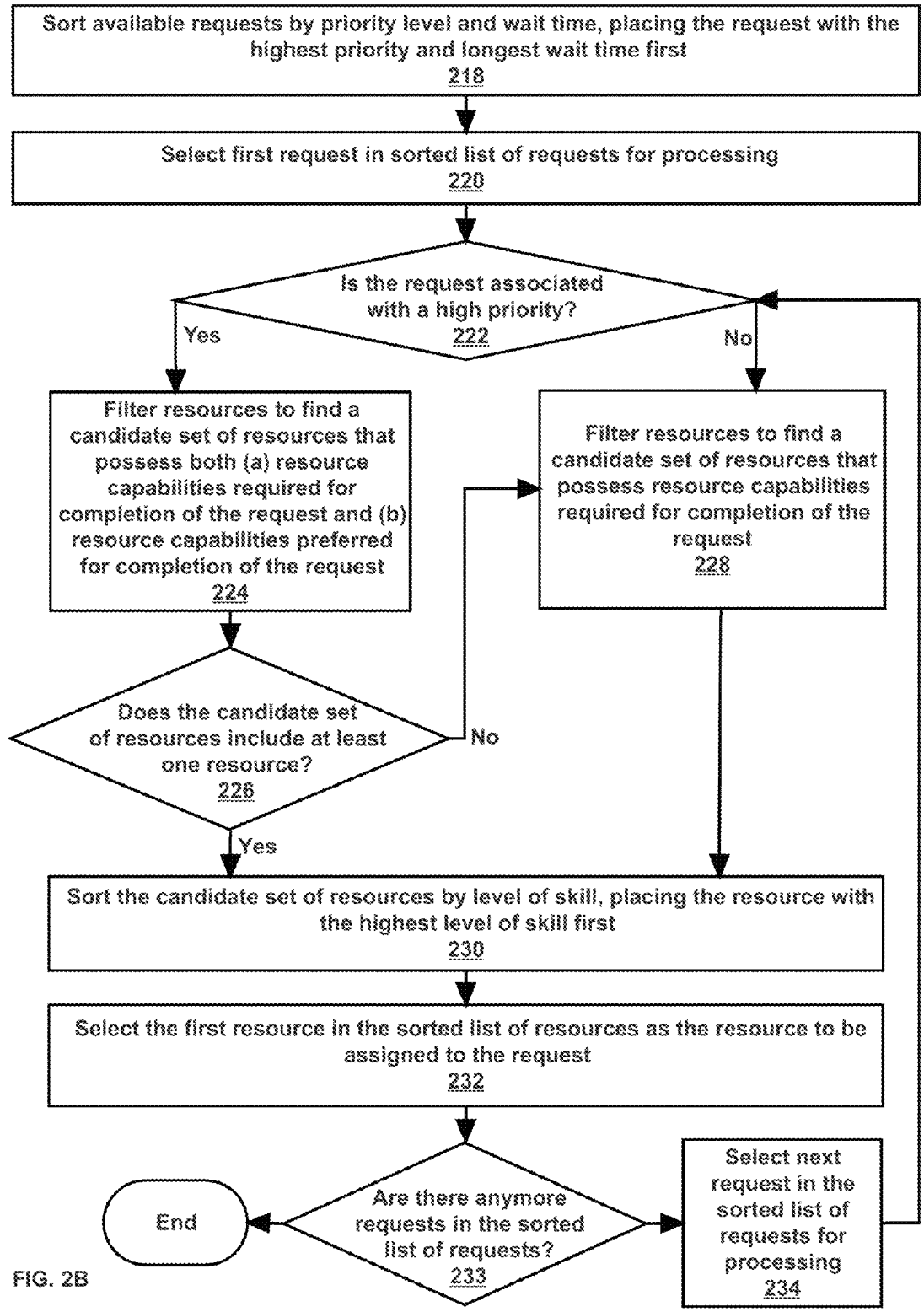
FIGS. 2B and 2C illustrate example sets of operations for implementing a sort/search algorithm to be applied with a data model to a constraint programming solver, in accordance with one or more embodiments.
Figure 2C:
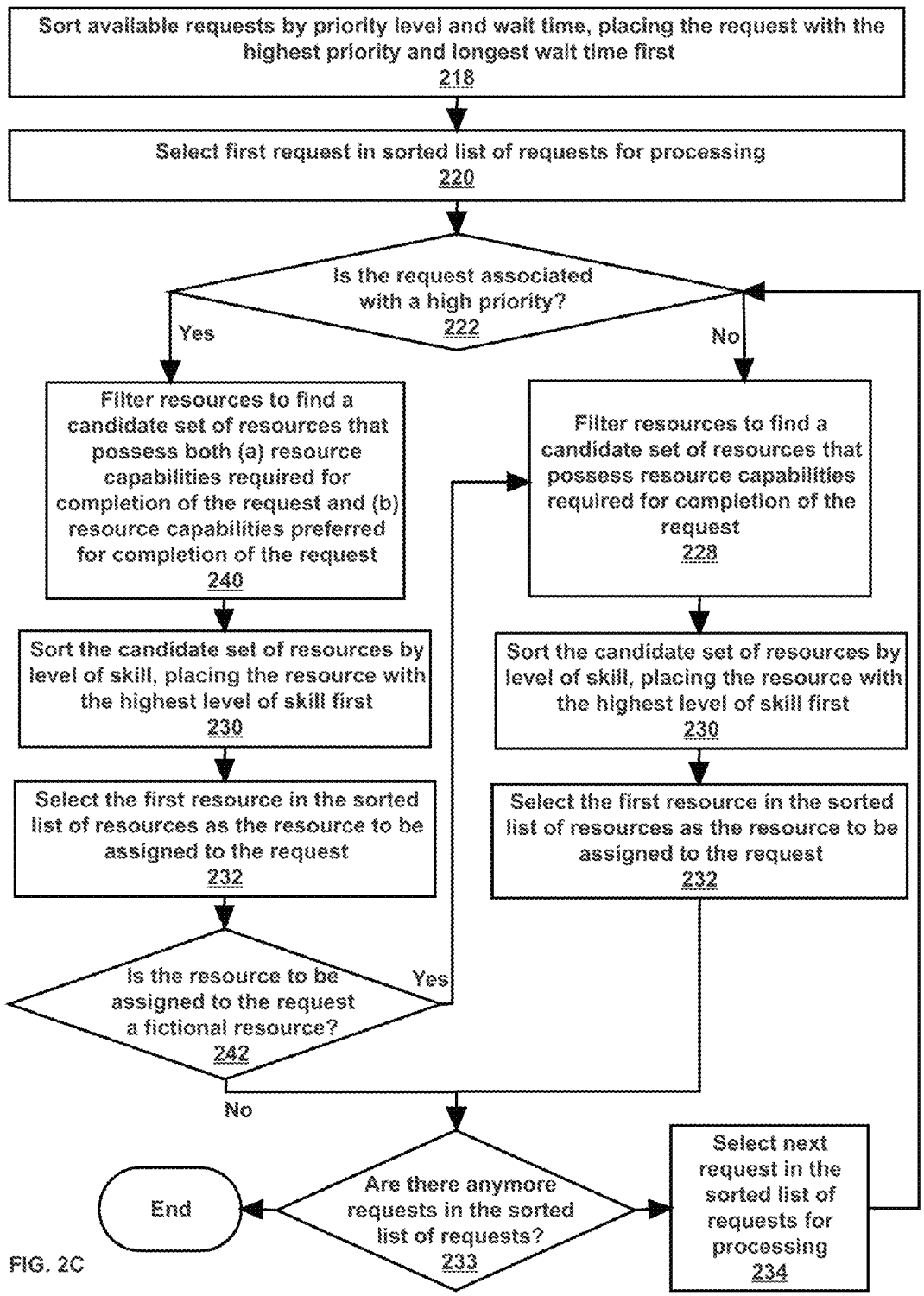

In an example, a first goal may be to assign high priority requests before low priority requests. A second goal may be to assign requests with longer wait times before requests with shorter wait times. A third goal may be to assign high priority requests to the best skilled resource possible. A fourth goal may be to assign requests to an actual resource, rather than a fictional resource, whenever possible. Based on these goals, example sets of operations executed by sort/search algorithms are described with reference to FIGS. 2B and 2C. Whether the set of operations in FIG. 2B or the set of operations in FIG. 2C apply depend on how a fictional resource is defined. The set of operations in FIG. 2B may apply where a fictional agent is determined to be associated with all resource capabilities required for completion of any request but not any resource capabilities preferred for completion of any request. The set of operations in FIG. 2C may apply where a fictional agent is determined to be associated with all resource capabilities required for completion of any request and all resource capabilities preferred for completion of any request. FIGS. 2B and 2C are described for purposes of clarity and explanation. Other sort/search algorithms may be used.

Referring to FIG. 2B, initially, the set of available requests may be sorted by priority and wait time, in accordance with one or more embodiments (Operation 218). The request with the highest priority and the longest wait time is placed first in the sorted list. The set of available requests are sorted first by priority, and then by wait time. A priority and wait time associated with each request are identified by processing attributes associated with each request. Requests with high priority are positioned before other requests in the sorted list of requests. Within a set of requests with the same priority level, requests with the longest wait time are positioned before the remaining requests in the set. The sorted list of requests may be stored in an array of request elements.

In one or more embodiments, a request positioned first in the sorted list of requests is selected for processing (Operation 220). If the sorted list of requests is stored in an array, then the first element of the array may be selected. This request is the request associated with the highest priority and the longest wait time.

In one or more embodiments, a determination is made as to whether the request is associated with a high priority (Operation 222). The priority associated with the request is identified by processing the attributes associated with the request. A priority attribute may indicate that a request is high priority or low priority.

In one or more embodiments, if a high priority request is being processed, then a set of available resources are filtered to find a candidate set of resources that have both (a) resource capabilities required for completion of the request and (b) resource capabilities preferred for completion of the request (Operation 224). The set of available resources are determined by comparing the constraint of a resource to the number of assignments already made to the resource. Based on the assignments already made to the resource, if an additional assignment of a request to the resource would comply with the constraint, then the resource is included in the set of available resources.

In an embodiment, for each resource in the set of available resources, a set of resource capabilities possessed by the resource is identified. If the possessed set of resource capabilities includes both resource capabilities required for completion of the request and resource capabilities preferred for completion of the request, then the resource may be included in the candidate set of resources for the request. The candidate set of resources are stored as a request domain of a request element.

In an embodiment, the candidate set of resources determined in this operation, for a high priority request, does not include a fictional resource. The fictional resource is defined as being not associated with any resource capability preferred for completion of any request. Since the set of resource capabilities of the fictional resource does not include resource capabilities preferred for completion of any request, the fictional resource is not included in the candidate set of resources.

In one or more embodiments, a determination is made as to whether the candidate set of resources, for a high priority request, includes at least one resource (Operation 226). In an example, a request domain of a request element is identified, and an inquiry is made as to whether the request domain is empty or not. If the request domain is empty, then no resources are included in the candidate set of resources. Otherwise, at least one resource is included in the candidate set of resources.

In one or more embodiments, if no resources are included in the candidate set of resources for a high priority request, or if a low priority request is being processed, then the set of available resources are filtered to find a candidate set of resources that have resource capabilities required for completion of the request (Operation 228). For each available resource, a set of resource capabilities possessed by the resource is identified. If the possessed set of resource capabilities includes resource capabilities required for completion of the request, then the resource may be included in the candidate set of resources for the request. The candidate set of resources are stored as a request domain of a request element.

In an embodiment, a high priority request that had no resources in the candidate set of resources based on Operation 224 may have one or more resources in the candidate set of resources based on Operation 228. In an example, a request Q1 may be associated with a high priority. The ability to speak English may be required for completing Q1. Expertise in Android may be preferred for completing Q1. A set of available resources may include only R1 and R2. R1 is able to speak English and has expertise in iOS. R2 is able to speak English and has expertise in Linux. First, the resources may be filtered to find a candidate set of resources that possess both (a) resource capabilities required for completion of Q1 and (b) resource capabilities preferred for completion of Q1, based on Operation 224. R1 possesses resource capabilities required for Q1 (the ability to speak English) but does not possess resource capabilities preferred for Q1 (expertise in Android). R2 possesses resource capabilities required for Q1 (the ability to speak English) but does not possess resource capabilities preferred for Q1 (expertise in Android). Thus, neither R1 nor R2 are included in the candidate set of resources. There are no resources in the candidate set of resources based on Operation 224. Then, the resources may be filtered to find a candidate set of resources that possess resource capabilities required for completion of Q1. As long as a resource possesses the resource capabilities that are required for completion of Q1, and regardless of whether the resource possesses the resource capabilities that are preferred for completion of Q1, the resource is selected. R1 possesses resource capabilities required for Q1 (the ability to speak English). R2 possesses resource capabilities required for Q1 (the ability to speak English). Thus, both R1 and R2 may be included in a candidate set of resources based on Operation 228.

In an embodiment, the candidate set of resources determined in this operation includes a fictional resource. The fictional resource is defined as being associated with all resource capabilities required for completion of any request. Since the set of resource capabilities of the fictional resource includes resource capabilities required for completion of any request, the fictional resource is included in the candidate set of resources.

In one or more embodiments, the candidate set of resources, determined at Operation 224 or Operation 228, is sorted by level of skill (Operation 230). First, a required set of resource capabilities for a request is identified. The skill levels associated with the required set of resource capabilities, possessed by each resource, in the candidate set of resources, are identified. Second, a preferred set of resource capabilities for a request is identified. The skill levels associated with the preferred set of resource capabilities, possessed by each resource, in the candidate set of resources, are identified. The candidate set of resources may then be sorted first by the skill levels associated with the required set of resource capabilities, then by the skill levels associated with the preferred set of resource capabilities. Resources with the highest skill levels in the required set of resource capabilities are positioned before other resources in the sorted list of resources. Within a set of resources with the same skill levels in the required set of resource capabilities, resources with the highest skill levels in the preferred set of resource capabilities are positioned before the remaining resources in the set. The sorted list of resources are stored as a request domain of a request element.

In an embodiment, if the candidate set of resources includes a fictional resource, then the fictional resource is positioned last in the sorted list of resources. A lowest level of skill is defined to be associated with each resource capability of a fictional resource. Based on the lowest level of skill, the fictional resource is placed last in the sorted list of resources.

In an example, Android skills may be required for completion of a particular request Q1. A first resource R1 may be a person who is skilled in Android with a skill level of five and skilled in iOS with a skill level of two. A second resource R2 may be a person who is skilled in Android with a skill level of three and skilled in iOS with a skill level of five. Since R1 and R2 are skilled in Android and available, R1 and R2 are included in a candidate set of resources for Q1. Since Q1 requires Android skills, the candidate set of resources for Q1 is sorted by the level of skill in Android, without reference to the level of skill in iOS. Since R1 is more skilled in Android than R2, the sorted set of resources places R1 before R2. The sorted set of resources may be stored in a request domain as {R1, R2}.

In one or more embodiments, a resource positioned first in the sorted list of resources is selected to be assigned to the request being processed (Operation 232). The first resource stored in the request domain is selected. This resource is the resource associated with the highest available level of skill in the resource capabilities required for completion of the request and the highest available level of skill in the resource capabilities preferred for completion of the request. This resource is selected for assignment to the request.

In an example, when a particular resource is selected for assignment to a request, the number of requests assigned to the particular resource may be incremented by one. At a later time, a second data model may be generated. The particular resource may or may not be included in the second data model based on the number of requests assigned to the particular resource. If the number of requests assigned to the particular resource is equal to the maximum capacity of the particular resource, then the particular resource is not included in the second data model.

In an embodiment, a fictional resource is selected to be assigned to a request if the sorted list of resources includes no actual resources. The fictional resource is positioned last in the sorted list of resources. If there are no other available resources, then the last position is also the first position in the sorted list of resource. Based on the fictional resource being positioned first in the sorted list of resources, the fictional resource is selected when there are no other available resources.

In one or more embodiments, an inquiry is made as to whether there is at least one request, in the sorted list of requests, that has not yet been processed (Operation 233). If none, then the procedure ends.

In one or more embodiments, if there is at least one request that has not yet been processed, then the next request in the sorted list of requests is selected for processing (Operation 234). This is the request with the next highest level of priority and the next longest wait time. Operations 222-234 are iterated until all requests in the sorted list of requests are processed.

Referring to FIG. 2C, operations in FIG. 2C that are the same as the operations in FIG. 2B are labeled with the same number. In one or more embodiments, the set of available requests may be sorted by priority and wait time, as described above (Operation 218). A request positioned first in the sorted list of requests is selected for processing, as described above (Operation 220). A determination is made as to whether the request is associated with a high priority, as described above (Operation 222).

In one or more embodiments, if a high priority request is being processed, then a set of available resources are filtered to find a candidate set of resources that have both (a) resource capabilities required for completion of the request and (b) resource capabilities preferred for completion of the request (Operation 240). Operation 240 is performed in the same way that Operation 224 is performed. However, the result of Operation 240 may be different from the result of Operation 224, due to the different definition of a fictional resource. In an embodiment, the candidate set of resources determined in this operation includes a fictional resource. The fictional resource is defined as being associated with all resource capabilities preferred for completion of any request. Since the set of resource capabilities of the fictional resource includes resource capabilities preferred for completion of any request, the fictional resource is included in the candidate set of resources.

In one or more embodiments, the candidate set of resources, determined at Operation 240, is sorted by level of skill, as described above (Operation 230). A resource positioned first in the sorted list of resources is selected to be assigned to the request being processed, as described above (Operation 232).

In one or more embodiments, a determination is made as to whether the resource, selected at Operation 232, for assignment to the request, is a fictional resource (Operation 242). If yes, then the fictional resource is serving as a placeholder to indicate that no actual resource having a resource capability preferred for completion of the request is available for being assigned to the request. If no, then the resource is an actual resource that may be assigned to the request.

In one or more embodiments, if the inquiry at Operation 242 indicates that a fictional resource has been selected, or if a low priority request is being processed, then the set of available resources are filtered to find a candidate set of resources that have resource capabilities required for completion of the request, as described above (Operation 228).

In one or more embodiments, the candidate set of resources, determined at Operation 228, is sorted by level of skill, as described above (Operation 230). A resource positioned first in the sorted list of resources is selected to be assigned to the request being processed, as described above (Operation 232).

In one or more embodiments, if the inquiry at Operation 242 indicates that a fictional resource has not been selected, or after a resource has been selected from the candidate of resource determined at Operation 228, then an inquiry is made as to whether there is at least one request, in the sorted list of requests, that has not yet been processed (Operation 233). If none, then the procedure ends. If there is at least one request that has not yet been processed, then the next request in the sorted list of requests is selected for processing, as described above (Operation 234).

Referring back to FIG. 2A, the data model generated at Operation 212, and the sort/search algorithms specified at Operation 214, are optionally input to a constraint programming solver, in accordance one or more embodiments (Operation 216). The data model and sort/search algorithms may be provided as input parameters to the constraint programming solver.

In an embodiment, the constraint programming solver is configured to apply one or more constraint programming algorithms that are well-known in the art. Constraint programming algorithms well-known in the art include backtracking and forward-checking algorithms.

In an example, a data model input to a constraint programming solver includes request elements and counting elements. Each request element corresponds to a request in a set of available requests. Each request element is associated with a request domain, which corresponds to a candidate set of resources for the request. Each counting element corresponds to a current number of requests assigned to each resource, and complies with a constraint for the resource.

Continuing the example above, the constraint programming solver may apply a backtracking algorithm. The backtracking algorithm may process each request sequentially. A request domain of a current request may be identified. A resource in the request domain may be temporarily selected to be assigned to the current request. If this assignment violates a constraint of the current request, then another resource in the request domain may be temporarily selected to be assigned to the current request. If all resources in the request domain are attempted and do not satisfy the constraint, then a re-assignment of a previous request may be made. The previous request was previously temporarily assigned a particular resource that satisfies the constraint of the previous request. The previous request is then temporarily reassigned another particular resource that also satisfies the constraint of the previous request. Then assignment of the current request may be reattempted. The algorithm may continue until a resource is assigned to every request.

Continuing the example above, a sort/search algorithm may also be input to the constraint programming solver. The sort/search algorithm may direct the order in which the requests are sequentially processed. The sort/search algorithm may specify which request is to be processed first, and which request is to be processed next. The sort/search algorithm may also direct the order in which resources are attempted for an assignment to a particular request. The sort/search algorithm may specify which resource, in a request domain, is to be tried first, and which resource, in the request domain, is to be tried next.

In an embodiment, the constraint programming solver assigns each request to a resource. In an example, a request may be assigned to an actual resource or a fictional resource. An assignment of a particular request to a fictional resource may indicate that the particular request has not yet been assigned to an actual resource. The particular resource may remain pending. In a later time period, a second data model may be generated and may be input to the constraint programming solver. The particular request may be included in a set of available requests in the second data model.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
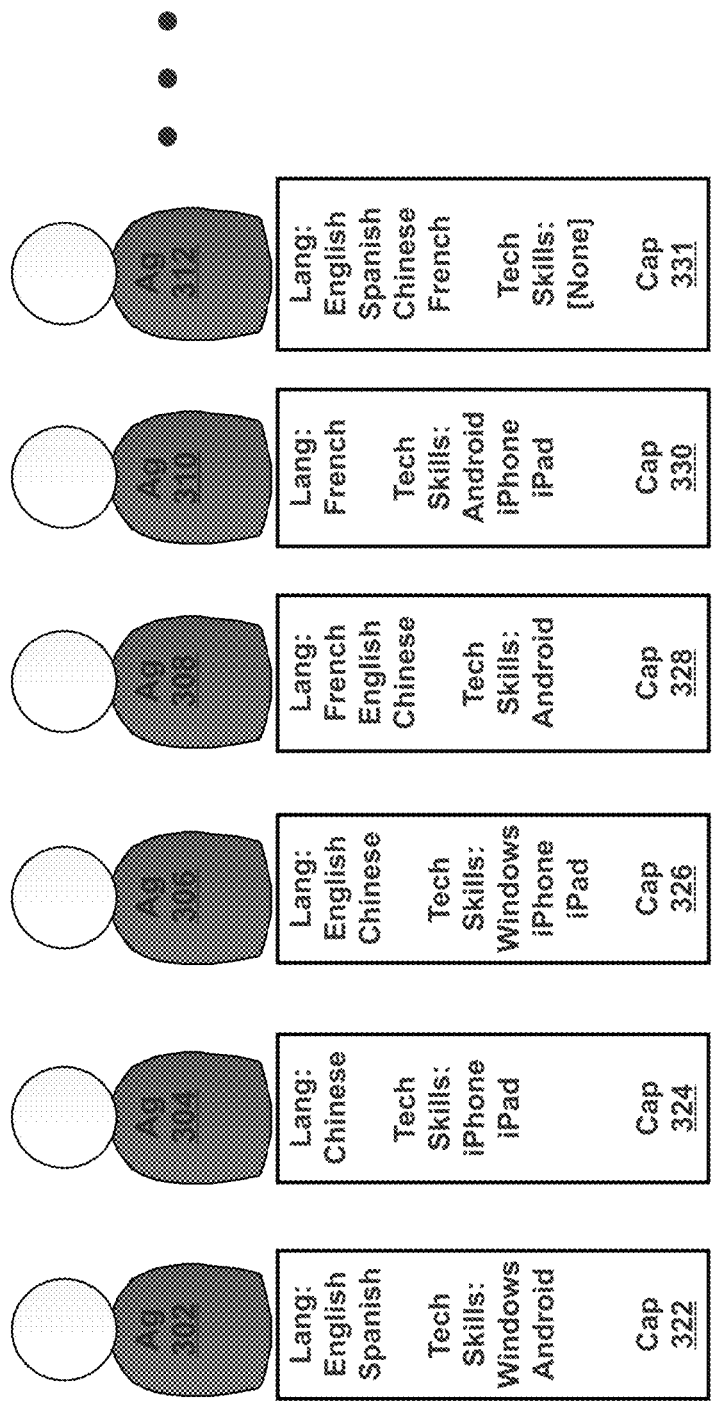

In an example, referring to FIG. 3A, a customer service call center has eight hundred customer service agents, represented as agents 302-310. Sets of resource capabilities 322-330, including technical capabilities and language capabilities, are identified for agents 302-310. Technical capabilities include skills in different technologies, such as Android, iPhone, iPad, and Windows. Language capabilities include skills in different languages, such as English, Chinese, French, and Spanish. As shown, agent 302 has English, Spanish, Windows, and Android skills. Agent 304 has Chinese, iPhone, and iPad skills. Agent 306 has English, Chinese, Windows, iPhone, and iPad skills. Agent 308 has French, English, Chinese, and Android skills. Agent 310 has French, Android, iPhone, and iPad skills. The customer service call center is also considered to have a fictional customer service agent 312. Fictional agent 312 is associated with resource capabilities 331. As shown, fictional agent 312 has all the language capabilities (English, Spanish, Chinese, and French), but none of the technical capabilities.

Figure 3B:
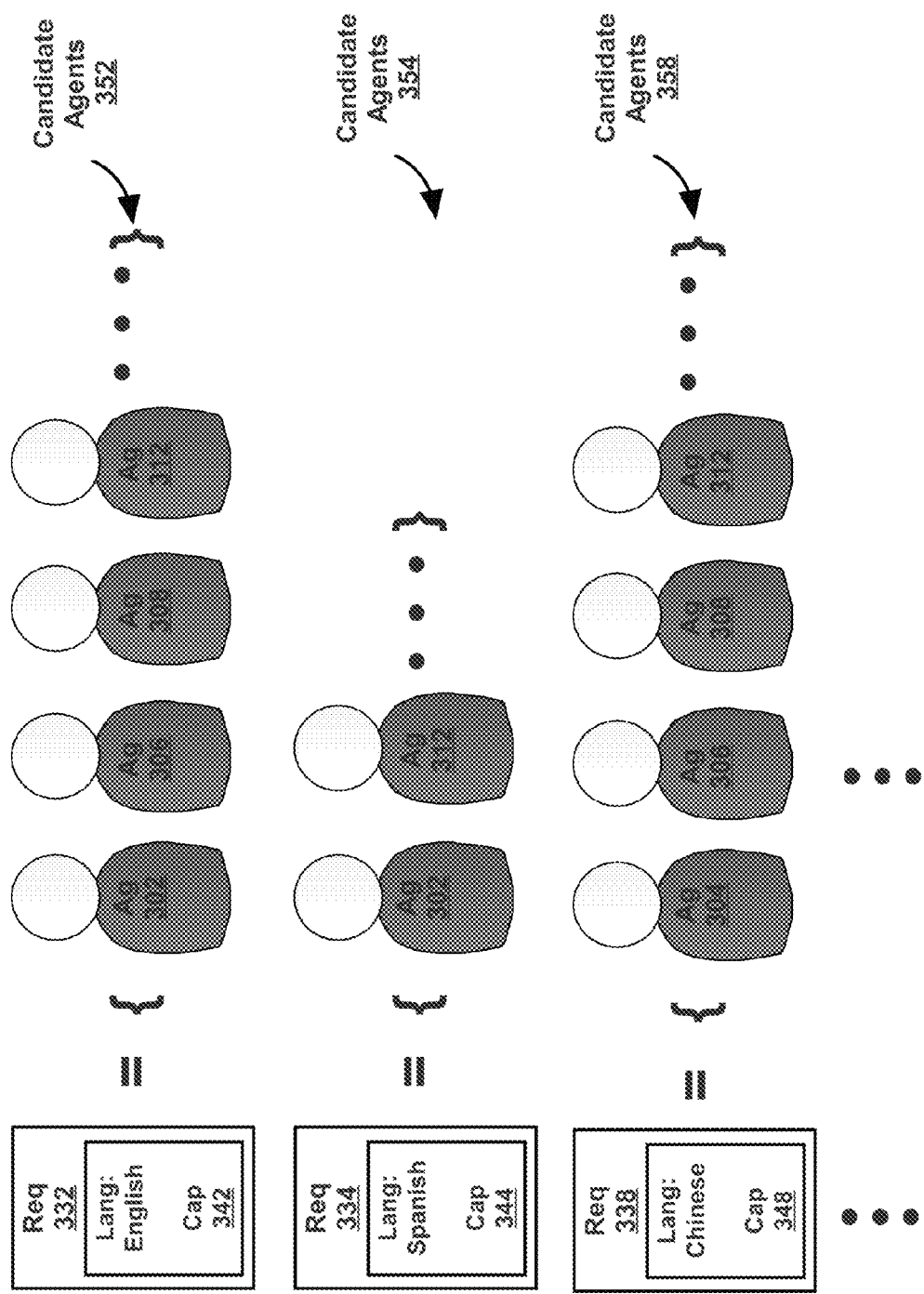

Referring to FIG. 3B, the customer service call center has currently received one thousand customer service requests, represented as requests 332-338. The customer service requests 332-338 need to be assigned the agents 302-312. Each request is made in a particular language, about a particular technology. A particular language capability is required for completion of each request. For example, a request made in English is required to be assigned to an agent with English skills. As illustrated, requests 332-338 are associated with resource capabilities 342-348 required for completion of requests 332-338, based on the languages in which requests 332-338 are made. Request 332 is associated with English skills. Request 334 is associated with Spanish skills. Request 338 is associated with Chinese skills. Each request is stored as a request element in a data model.

Candidate sets of agents 352-358 are determined for requests 332-338. A candidate set of agents for a particular request is determined based on resource capabilities required for completion of the particular request. The candidate set of agents includes agents that possess the language skill associated with the particular skill. A candidate set of agents is stored as a request domain corresponding to the particular request. As illustrated, agents 302, 306, 308, and 312 have English skills, and are thus included in a candidate set of agents 352 for request 332. Agents 302 and 312 have Spanish skills, and are thus included in a candidate set of agents 354 for request 334. Agents 304, 306, 308, and 312 have Chinese skills, and are thus included in a candidate set of agents 358 for 338. It may be noted that the fictional agent 312 is included in each candidate set of agents, since the fictional agent 312 possesses all of the language capabilities.

Referring to FIG. 3C, agents 302-312 are associated with capacities 362-374. A capacity is a maximum number of requests that may be concurrently assigned to an agent. As illustrated, agent 302 has a capacity of two. Agent 304 has a capacity of four. Fictional agent 312 has a capacity of one thousand. It may be noted that the fictional agent 312 has a capacity that is equal to the number of requests currently available. Each capacity corresponds to an agent and is stored as a capacity element in a data model.

A set of possible assignments for a particular agent are identified based on a constraint corresponding to the particular agent. The set of possible assignments are stored in a capacity domain corresponding to the particular agent. Based on a capacity of two for agent 302, zero, one, or two requests may be concurrently assigned to agent 302. Thus, a capacity domain of agent 302 is {0, 1, 2}. Similarly, a capacity domain of agent 304 is determined. The capacity domain of agent 304 is {0, 1, 2, 3, 4}. A capacity domain of the fictional agent 312 includes a set of sequential numbers ranging from zero to the number of requests received by the customer service call center, which is one thousand. The capacity domain of fictional agent 312 is {0, 1, 2, . . . 1000}.

A data model is generated including the request elements and the capacity elements. Each request element is associated with a request domain, and each capacity element is associated with a capacity domain, as described above. The data model may be input to a constraint programming solver.

Sort/search algorithms, to be applied with the data model to the constraint programming solver, may be specified. A sort/search algorithms is specified based on a particular goal. A particular goal is to assign, for a particular request that is associated with a high priority, an agent who possess both resource capabilities required for completion of the particular request and resource capabilities preferred for completion of the particular request.

As described above, each request is made in a particular language, about a particular technology. While a particular language capability is required for completion of a particular request, a particular technical capability is preferred for completion of a particular request. For example, a request about Android is made in English. The request is required to be assigned to an agent with English skills. The request is preferred, but not required, to be assigned to an agent with Android skills. A particular goal is to assign, to a high priority request, an agent who possess both the language capability and the technical capability associated with the high priority request.

Figure 3D:
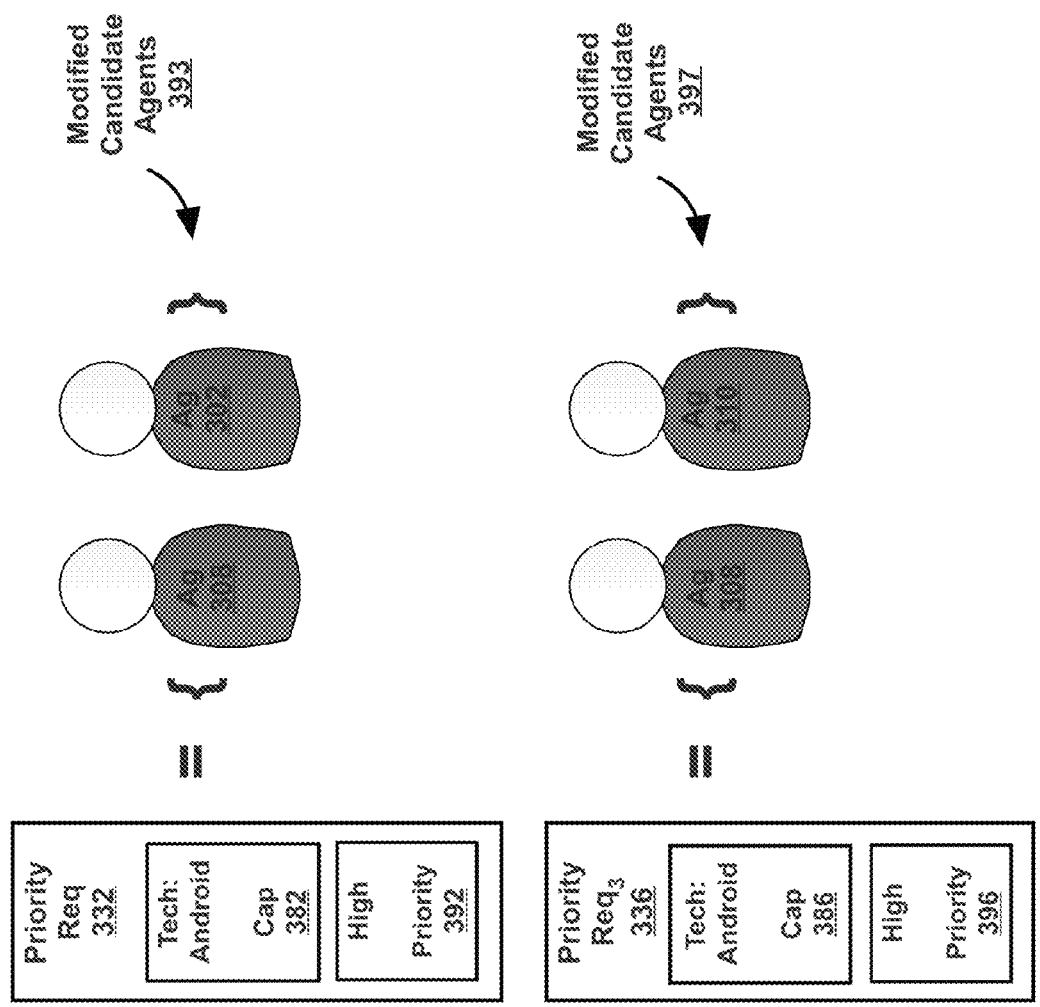

Referring to FIG. 3D, a priority level of each request is identified by processing the attributes of the request. Request 332 is associated with priority attribute 392. Request 336 is associated with priority attribute 396. Request 332 and request 336 are each associated with a high priority.

Requests 332 and 336 are associated with resource capabilities 382 and 386 preferred for completion of requests 332 and 336, based on the technologies involved in requests 332 and 336. Request 332 is associated with Android skills. Request 336 is associated with Android skills.

Modified candidate sets of agents 393 and 397 are determined for requests 332 and 336. A modified candidate set of agents 393 is filtered from the candidate set of agents 352, corresponding to request 332. The modified candidate set of agents 393 is a subset of the candidate set of agents 352 who possess the technical skill associated with request 332. Similarly, a modified candidate set of agents 397 is filtered from the candidate set of agents 356, corresponding to request 336. The modified candidate set of agents 397 is a subset of the candidate set of agents 356 who possess the technical skill associated with request 336. Agents 302 and 308 possess Android skills, and are thus included in modified candidate set of agents 393. Agents 308 and 310 possess Android skills, and are thus included in modified candidate set of agents 397. A modified candidate set of agents is stored as a modified request domain corresponding to the particular request. It may be noted that the fictional agent 312 is not included in any modified candidate sets of agents, since the fictional agent 312 does not possess any of the technical capabilities.

A sort/search algorithm may direct a constraint programming solver to assign an agent from a modified candidate set of agents to a high priority request. A sort/search algorithm may further direct the constraint programming solver to assign an agent from a candidate set of agents to a request, if assigning an agent from the modified candidate set of agents is not possible. A sort/search algorithm may further direct the constraint programming solver to assign an actual agent, rather than fictional agent 312, to a request, if at least one actual agent is available. The data model and the sort/search algorithm may be provided as input parameters to the constraint programming solver. The constraint programming solver may output an assignment of each request to an agent. If a particular request is assigned to the fictional agent 312, then the particular request is determined to be unassigned. At a later time, a second data model may be generated. The particular request may be included as a request element in the second data model.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
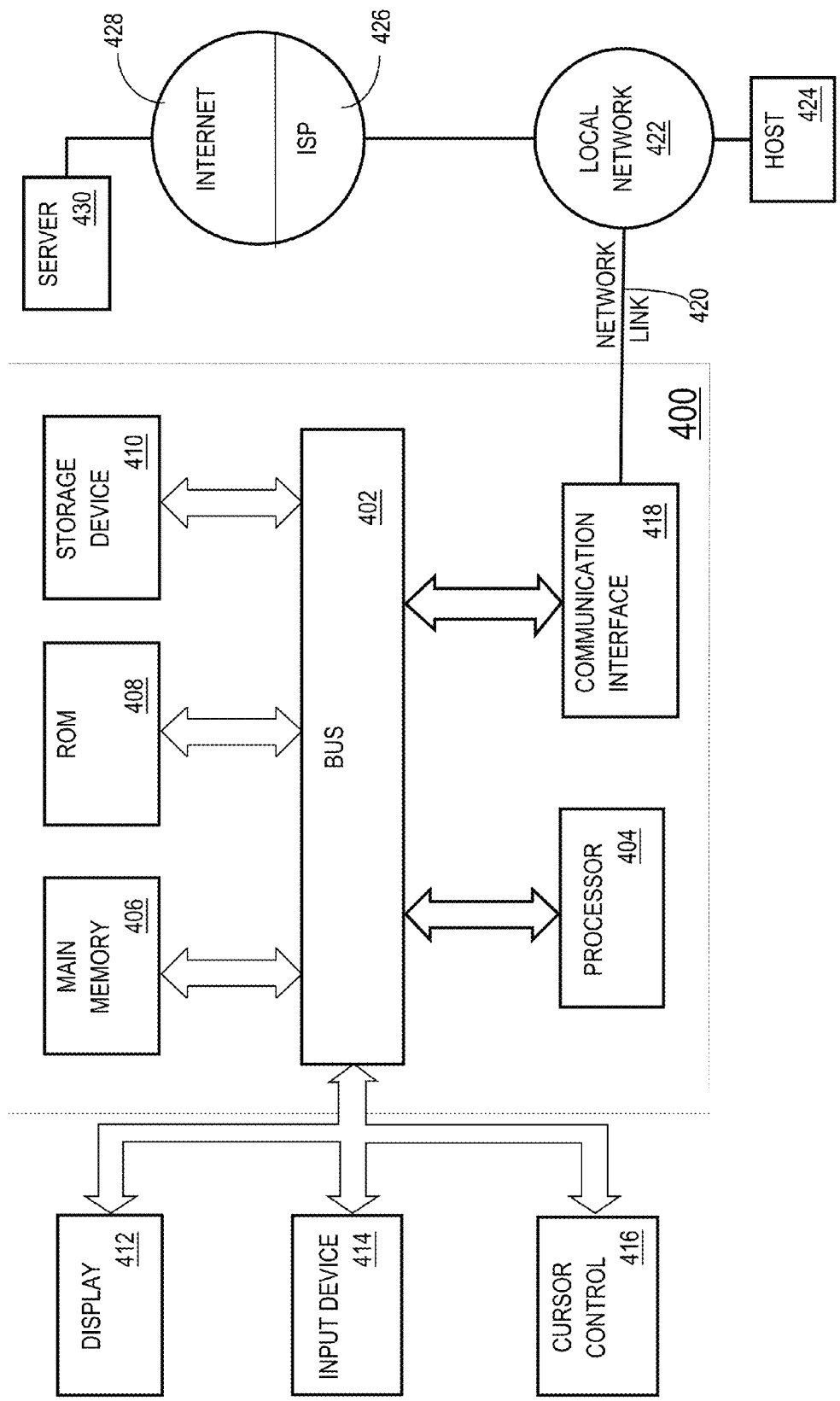
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a first set of one or more resource capabilities for each resource in a plurality of resources;
    for each particular request in a plurality of requests:

identifying a second set of one or more resource capabilities required for completion of the particular request;

based at least on (a) the first set of resource capabilities for each resource in the plurality of resources and (b) the second set of resource capabilities required for completion of the particular request:

selecting a candidate set of one or more resources, from the plurality of resources, for the particular request, the first set of resource capabilities for each of the candidate set of resources including the second set of resource capabilities required for completion of the particular request;

specifying a set of constraints that limit an assignment of a first resource in the plurality of resources based on the assignment of the first resource to one or more requests in the plurality of requests; and creating a data model comprising:
the set of constraints;
a plurality of data model elements corresponding respectively to the plurality of requests, each particular data model element, in the plurality of data model elements, including a set of identifiers corresponding to the candidate set of resources for the respective request.

2. The medium of claim 1, wherein the set of constraints is a subset of a plurality of available constraints.

3. The medium of claim 1, wherein creating the data model comprises creating a software data object.

4. The medium of claim 1, wherein creating the data model comprises:
creating a software data structure comprising a plurality of data structure elements corresponding respectively to the plurality of requests, each particular data structure element, in the plurality of data structure elements, including a set of identifiers corresponding to the candidate set of resources for the respective request.

5. The medium of claim 4, wherein the set of constraints is included in the software data structure.

6. The medium of claim 1, wherein the data model specifies a number of requests that may be concurrently assigned to a particular resource in the plurality of resources.

7. The medium of claim 1, wherein the data model specifies a number and a type of requests that may be concurrently assigned to a particular resource in the plurality of resources.

8. The medium of claim 1, wherein the operations further comprise causing application of the data model to a constraint programming solver to assign, to each particular request in the plurality of requests, a particular resource from the candidate set of resources selected for the particular request.

9. The medium of claim 1, wherein the operations further comprise applying a constraint programming solver to the data model to assign, to each particular request in the plurality of requests, a particular resource from the candidate set of resources selected for the particular request.

10. The medium of claim 1, wherein the data model is used as input to a software function executed by a machine.

11. The medium of claim 1, wherein the plurality of resources comprises a first set of one or more actual resources and a second set of one or more fictional resources, wherein a request of the plurality of requests may be assigned temporarily to a fictional resource in the second set of fictional resources.

12. The medium of claim 11, wherein the fictional resource in the second set of fictional resources is configured with one or more attribute values that result in an assignment of an actual resource of the first set of actual resources when both the actual resource and the fictional resource are available for assignment to a first request.

13. The medium of claim 1, wherein the operations further comprise one of more of (a) sorting the set of identifiers corresponding to the candidate set of resources based on one or more attributes associated with the candidate set of resources, and (b) filtering the set of identifiers corresponding to the candidate set of resources based on one or more attributes associated with the candidate set of resources.

14. The medium of claim 1, wherein the operations further comprise assigning a resource of the plurality of resources to each of the plurality of requests.

15. The medium of claim 1, wherein the operations further comprise selecting a search algorithm to be applied with the data model to a constraint programming solver based on a specified goal.

16. The medium of claim 1, wherein the operations further comprise:
determining that a first request is associated with a priority level above a threshold value;
responsive to determining that the first request is associated with the priority level above the threshold value:
identifying a third set of one or more resource capabilities preferred for completion of the first request; and
selecting the candidate set of one or more resources for the first request based further on the third set of resource capabilities preferred for completion of the first request.

17. The medium of claim 1, wherein the operations further comprise:
specifying a search algorithm configured to select a particular resource, for a first request, that is associated with a highest available level of resource capabilities.

18. The medium of claim 1, wherein:
the plurality of resources comprises a first set of one or more actual resources and a second set of one or more fictional resources, each fictional resource associated with each resource capability in the second set of resource capabilities required for completion of each particular request, and each fictional resource associated with a lowest level of skill for each resource capability in the second set of resource capabilities required for completion of each particular request; and
the operations further comprise:
specifying an algorithm configured to:
sort the plurality of data model elements corresponding respectively to the plurality of requests based on a level of priority associated with each of the plurality of requests, to place a particular data model element corresponding to a request with a highest level of priority first within the plurality of data model elements;
sort the plurality of data model elements corresponding respectively to the plurality of requests based on a wait time associated with each of the plurality of requests, to place a particular data model element corresponding to a request with a longest wait time first within a subset of data model elements corresponding to requests associated with a same level of priority;
for each data model element: sort the set of identifiers corresponding to the candidate set of resources for the respective request based on a level of skill associated with at least one of the first set of resource capabilities of each of the candidate set of resources;
identify a subset of data model elements corresponding to a subset of requests that are associated with a level of priority that is above a threshold;
for each data model element within the subset of data model elements:
identify a third set of one or more resource capabilities preferred for completion of the request; and
select the candidate set of one or more resources for the request based further on the third set of resource capabilities preferred for completion of the request; and
applying a constraint programming solver to the data model, using the algorithm, to assign, to each particular request in the plurality of requests, a particular resource from the candidate set of resources selected for the particular request.

19. A method, executing in a computer system having at least one processor, comprising:
identifying a first set of one or more resource capabilities for each resource in a plurality of resources;
for each particular request in a plurality of requests:
identifying a second set of one or more resource capabilities required for completion of the particular request;
based at least on (a) the first set of resource capabilities for each resource in the plurality of resources and (b) the second set of resource capabilities required for completion of the particular request:
selecting a candidate set of one or more resources, from the plurality of resources, for the particular request, the first set of resource capabilities for each of the candidate set of resources including the second set of resource capabilities required for completion of the particular request;
specifying a set of constraints that limit an assignment of a first resource in the plurality of resources based on the assignment of the first resource to one or more requests in the plurality of requests; and
creating a data model comprising:
the set of constraints;
a plurality of data model elements corresponding respectively to the plurality of requests, each particular data model element, in the plurality of data model elements, including a set of identifiers corresponding to the candidate set of resources for the respective request.

20. A system, comprising:
at least one device including a hardware processor; and
the system configured to perform operations, comprising:
identifying a first set of one or more resource capabilities for each resource in a plurality of resources;
for each particular request in a plurality of requests:
identifying a second set of one or more resource capabilities required for completion of the particular request;
based at least on (a) the first set of resource capabilities for each resource in the plurality of resources and (b) the second set of resource capabilities required for completion of the particular request:
selecting a candidate set of one or more resources, from the plurality of resources, for the particular request, the first set of resource capabilities for each of the candidate set of resources including the second set of resource capabilities required for completion of the particular request;
specifying a set of constraints that limit an assignment of a first resource in the plurality of resources based on the assignment of the first resource to one or more requests in the plurality of requests; and
creating a data model comprising:
the set of constraints;
a plurality of data model elements corresponding respectively to the plurality of requests, each particular data model element, in the plurality of data model elements, including a set of identifiers corresponding to the candidate set of resources for the respective request.

* * * * *

UNITED STATES PATENT AND TRADEMARK OFFICE
CERTIFICATE OF CORRECTION

PATENT NO. : 9,588,819 B2  
APPLICATION NO. : 14/808231  
DATED : March 7, 2017  
INVENTOR(S) : Kadioglu et al.

Page 1 of 1

It is certified that error appears in the above-identified patent and that said Letters Patent is hereby corrected as shown below:

On page 2, Column 1, under Other Publications, Line 4, delete ""WebSpaere" and insert -- "WebSphere --, therefor.

In Column 7, Line 36, delete "that that" and insert -- that --, therefor.

In Column 9, Line 7, delete "checking" and insert -- checking. --, therefor.

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*